(12) United States Patent
Williamson

(10) Patent No.: US 12,359,875 B2
(45) Date of Patent: Jul. 15, 2025

(54) HEAT EXCHANGER

(71) Applicant: CLEAN POWER HYDROGEN GROUP LIMITED, Doncaster (GB)

(72) Inventor: Nigel David Lister Williamson, Dronfield (GB)

(73) Assignee: CLEAN POWER HYDROGEN GROUP LIMITED, Doncaster (GB)

( * ) Notice: Subject to any disclaimer, the term of this patent is extended or adjusted under 35 U.S.C. 154(b) by 267 days.

(21) Appl. No.: 18/044,070

(22) PCT Filed: Sep. 4, 2020

(86) PCT No.: PCT/GB2020/052124
§ 371 (c)(1),
(2) Date: Mar. 3, 2023

(87) PCT Pub. No.: WO2022/049359
PCT Pub. Date: Mar. 10, 2022

(65) Prior Publication Data
US 2023/0375276 A1    Nov. 23, 2023

(51) Int. Cl.
*F28D 9/00* (2006.01)
*C25B 1/044* (2021.01)
*F25J 3/02* (2006.01)

(52) U.S. Cl.
CPC ............ *F28D 9/0093* (2013.01); *C25B 1/044* (2021.01); *F25J 3/0252* (2013.01); *F28D 9/0075* (2013.01); *Y02E 60/36* (2013.01)

(58) Field of Classification Search
CPC ...... F28D 9/0093; F28D 9/0075; F28D 9/005; C01B 3/506; C25B 15/08; C25B 15/083;

(Continued)

(56) References Cited

U.S. PATENT DOCUMENTS 448,521 A * 3/1891 Horner ............... F28B 9/10
165/DIG. 185
2,596,008 A * 5/1952 Cornette ............ F28D 9/0037
165/157

(Continued)

FOREIGN PATENT DOCUMENTS

DE     3224339 A1 * 1/1984 ............ B01D 53/04
DE  102004020602 A1   12/2005

(Continued)

OTHER PUBLICATIONS

Patent Cooperation Treaty, International Search Report and Written Opinion, International Application No. PCT/GB2020/052124, May 11, 2021, 10 pages.

(Continued)

*Primary Examiner* — Jianying C Atkisson
*Assistant Examiner* — For K Ling
(74) *Attorney, Agent, or Firm* — Polsinelli PC

(57) ABSTRACT

A heat exchanger comprises a plurality of cells formed by a stack of alternate planar flow-guide plates (1) and heat transfer plates (2), each heat transfer plate having at least three apertures (3, 4, 6) therethrough, each aperture defining a part of a respective one of at least three fluid flow paths in the heat exchanger. Each flow-guide plate has apertures therethrough corresponding to at least two of the flow paths and a larger aperture (5, 7, 8) therethrough configured to guide fluid in the remaining flow path across the face of the heat transfer plates between which the flow-guide plate is located, each successive flow-guide plate in the stack forming part of a different flow path from the preceding one in the stack.

11 Claims, 3 Drawing Sheets

(58) Field of Classification Search
CPC .. C25B 1/044; C25B 1/04; C25B 1/02; C25B 9/05; C25B 9/19; C25B 9/73; C25B 9/75; C25B 11/00; C25B 11/02; F25J 3/0252; F28F 3/06
USPC ........................................................ 165/140
See application file for complete search history.

(56) References Cited

U.S. PATENT DOCUMENTS

| | | | | | |
|---|---|---|---|---|---|
| 2,782,010 | A | * | 2/1957 | Simpelaar | F28F 9/0278 |
| | | | | | 165/167 |
| 3,126,942 | A | * | 3/1964 | Tyler | F28F 3/00 |
| | | | | | 431/89 |
| 3,404,733 | A | * | 10/1968 | Pottharst, Jr. | F28F 3/083 |
| | | | | | 165/166 |
| 3,532,161 | A | * | 10/1970 | Loebel | F28F 3/046 |
| | | | | | 165/140 |
| 4,815,534 | A | | 3/1989 | Fuerschbach | |
| 5,071,458 | A | * | 12/1991 | Grenier | F25J 3/04412 |
| | | | | | 62/903 |
| 5,462,113 | A | * | 10/1995 | Wand | F28D 9/0093 |
| | | | | | 165/140 |
| 6,142,221 | A | * | 11/2000 | Johansson | F28D 9/005 |
| | | | | | 165/140 |
| 6,349,566 | B1 | * | 2/2002 | Howard | F25J 3/0233 |
| | | | | | 62/903 |
| 6,461,583 | B1 | | 10/2002 | Hayashida et al. | |
| 8,448,460 | B2 | * | 5/2013 | Dogariu | H01M 10/635 |
| | | | | | 62/185 |
| 2011/0120678 | A1 | * | 5/2011 | Palm | F28D 9/0075 |
| | | | | | 165/164 |
| 2016/0145749 | A1 | | 5/2016 | Nigel | |
| 2018/0058766 | A1 | * | 3/2018 | Tokozakura | F28D 9/005 |
| 2020/0318529 | A1 | * | 10/2020 | Miyagawa | F28F 27/02 |

FOREIGN PATENT DOCUMENTS

| | | |
|---|---|---|
| DE | 202009015586 U1 | 3/2011 |
| EP | 3059543 A1 | 8/2016 |
| JP | 10019482 A | 1/1998 |
| JP | 2008082650 A | 4/2008 |
| WO | 9708506 A1 | 3/1997 |
| WO | 2009155703 A1 | 12/2009 |
| WO | 2014170337 A1 | 10/2014 |

OTHER PUBLICATIONS

Patent Cooperation Treaty, International Search Report and Written Opinion, International Application No. PCT/GB2020/052124, date of mailing May 11, 2021, 10 pages.
Intellectual Property Office, Combined Search and Examination Report under Sections 17 and 18(3), Application No. GB2205242.7, Oct. 21, 2022, 5 pages.
The Eurasian Patent Office, Office Action, Application No. 202390749/31, date of mailing May 26, 2023, 5 pages.
Japan Patent Office, Notice of Reasons for Rejection, Application No. 2023-515070, Nov. 19, 2024, 7 pages.
United Arab Emirates Ministry of Economy, Non-Final Rejection and Search Report, Application No. P60000497/2023, Dec. 13, 2024, 3 pages.

* cited by examiner

HEAT EXCHANGER

FIELD OF THE INVENTION

This invention relates to heat exchanger for example for use in a cryogenic system for the separation of electrolytically produced oxygen and hydrogen.

BACKGROUND TO THE INVENTION

The efficient and cost-effective production of hydrogen as a fuel to replace fossil fuels has recently gained significant momentum, resulting in an exponential growth in demand for electrolysis technologies which are robust, cost-effective and efficient. The capture of solar energy by the use of arrays of photovoltaic cells, for example, has become a significant source of electrical power in many countries. However, because maximum power generation by such arrays does not necessarily coincide with demand, it is necessary to store the energy. The use of batteries for storage is costly and relatively inefficient, and because of their weight they are not an ideal solution for road and rail vehicles, with range between charging being a significant limitation. Because suitable locations for installation of the arrays with uninterrupted sunlight and availability of land are not always near where the electricity is needed, storage of energy becomes an even more important issue.

The use of electricity from solar arrays and the like to electrolyse water into hydrogen and oxygen will enable the production of hydrogen as a readily transportable fuel, along with oxygen for use in industrial processes, for example. This might enable the solar arrays to be positioned away from inhabited areas, on land that receives strong sunlight and is otherwise unproductive.

Electrolysis systems for hydrogen gas generation are described in WO2014/170337A1 and GB2515292A. These produce a mixed gas stream which then needs to be separated, for example by cryogenic distillation of the oxygen. WO2015/118073A1 discloses an alternative arrangement having stacked cells and using the flow of an electrolyte to carry the gases in separate fluid circuits to respective degassing units for removal of the generated hydrogen or oxygen.

Where a mixed gas stream is produced, the cryogenic distillation system requires a heat exchanger to use the cooled hydrogen and oxygen streams to reduce the temperature of the incoming mixed gas stream. The heat exchanger requires the following properties:
1. Provision of three independent and separate streams (most are 2-stream units)
2. Capability to operate at cryogenic temperatures (circa 70K)
3. Pressure resistant during operation, with internal pressures up to 50 bar (g) or higher, while sitting in a vacuum chamber
4. Capability to provide turbulent flow through all streams to ensure maximum heat transfer from stream-to-stream
5. Capability to withstand internal explosion of the gases within the system
6. Totally leak-free throughout pressure and thermal transients
7. Relatively simple to manufacture
8. Low manufactured cost

SUMMARY OF THE INVENTION

The invention provides a heat exchanger comprising a plurality of cells formed by a stack of alternate planar flow-guide plates and heat transfer plates, each heat transfer plate having at least three apertures therethrough, each aperture defining a part of a respective one of at least three fluid flow paths in the heat exchanger, each flow-guide plate having apertures therethrough corresponding to at least two of the flow paths and a larger aperture therethrough configured to guide fluid in the remaining flow path across the face of the heat transfer plates between which the flow-guide plate is located, each successive flow-guide plate in the stack forming part of a different flow path from the preceding one in the stack.

At least some of the cells may include a turbulence-inducing matrix therein. The matrix may comprise a welded or woven mesh insert within the cell, or it may comprise a formation on the surface of at least one of the heat transfer plates between which the cell is defined.

The plates are suitably formed from stainless steel, and the plates are preferably bonded together by copper brazing. The stainless steel is suitably 316L stainless steel, which has a similar coefficient of linear thermal expansion to copper. The plates may be generally rectangular in plan, but it will be appreciated that other external shapes may be employed.

A pair of end plates are suitably provided, between which the stack of plates is clamped, the end plates having flow connections therethrough.

The cells in the stack need not be equally divided between the three flow paths. For example it may be desirable to make the oxygen return path longer than that for the hydrogen, because the thermal conductivity of oxygen is smaller than that of hydrogen. Alternatively, or additionally, the internal arrangement of the cells may be varied to take account of the different thermal conductivities.

It may be desirable to reverse the orientation of the cells along the stack to vary the direction of flow across the face of the heat transfer plates in each of the flow paths along the length of the stack.

While the heat exchanger of the invention may be configured to handle more than three flow paths, to permit its use when separating multiple gases from a mixed gas stream, for example, it may be employed in apparatus for the separation of hydrogen and oxygen, for example produced from the electrolysis of water.

Accordingly, another aspect of the invention provides apparatus for separating hydrogen and oxygen from a mixed gas stream, comprising a mixed gas inlet connected to a condensing coil at least partially submerged in liquid nitrogen in an insulated container, a liquid oxygen reservoir connected to the condensing coil, a hydrogen gas outlet from the liquid oxygen reservoir, an oxygen flow control valve connected to the liquid oxygen reservoir, and a heat exchanger according to any preceding claim, wherein the mixed gas inlet is connected to a first flow path in the heat exchanger, the hydrogen gas outlet is connected to a second flow path in the heat exchanger and the oxygen flow control valve is connected to the third flow path in the heat exchanger.

The heat exchanger is preferably mounted within a vacuum chamber above the liquid nitrogen container.

The mixed gas stream may be generated by the decomposition of water by electrolysis.

BRIEF DESCRIPTION OF THE DRAWINGS

In the drawings, which illustrate embodiments of the invention.

DETAILED DESCRIPTION OF THE ILLUSTRATED EMBODIMENT

Figure 1:
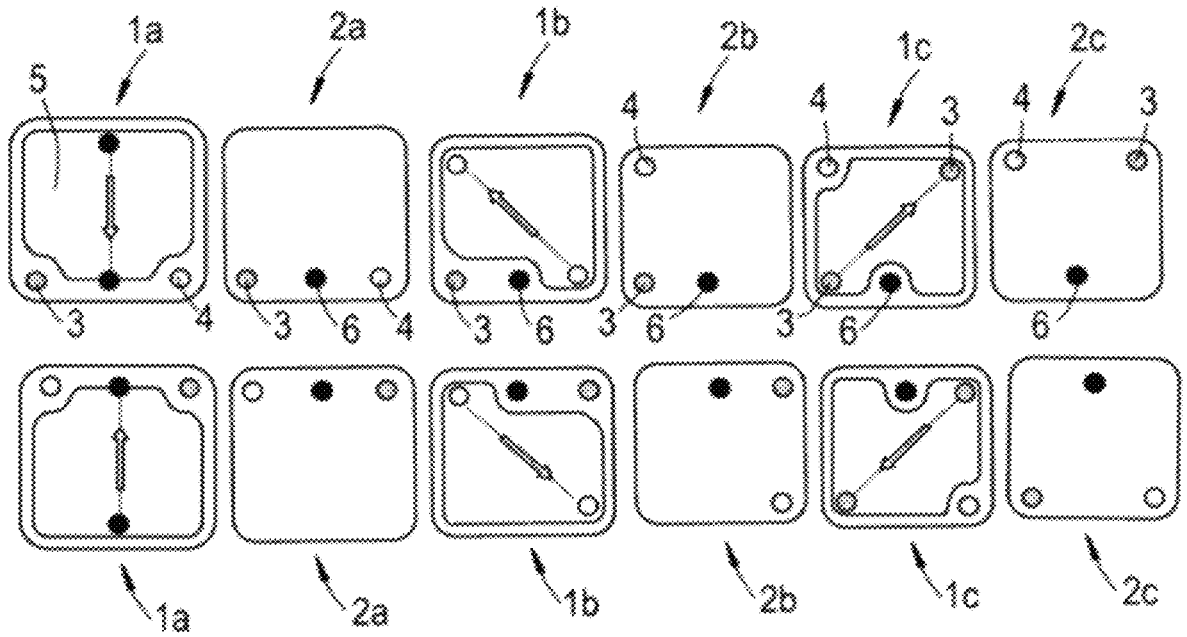
FIG. 1 shows one example of a sequence of plates used in a heat exchanger according to the invention.

Referring first to FIG. 1, the heat exchanger is formed from a series of thin plates of two general types—flow guide plates 1 (typically around 1.5 mm to 2.5 mm in thickness) and heat transfer plates 2 (typically around 0.5 mm to 1.5 mm in thickness)—stacked alternately. In the embodiment illustrated in the Figure, there are three different flow guide plates 1a, 1b, and 1c and three different heat transfer plates 2a, 2b and 2c, each having apertures therethrough, each aperture forming part of one of three fluid flow paths through the heat exchanger. In the Figure, the apertures relating to the three flow paths are indicated by black, grey and white circles respectively. FIG. 1 illustrates a sequence of twelve plates in a stack, but the numbers are not limited to this; a typical heat exchanger may include 48 cells for a small flow rate and up to 200 or more cells for larger systems. Taking the plates in the sequence shown (which is for illustrative purposes, other arrangements being possible), the first flow guide plate 1a is in the form of a generally square frame with radiused corners, each of the plates having the same external form. One edge portion of the frame is widened to accommodate an aperture 3 forming part of the second path in one corner of the frame and an aperture 4 forming part of the third flow path in the other corner. The area 5 within the frame is shaped to align with a spaced-apart inlet and outlet for the first flow path, shown as black circles with the direction of flow between them indicated by an arrow, but the inlet and outlet do not actually form part of the plate 1a.

The next plate 2a in the stack is a heat-transfer plate, provided with three apertures 3, 4 and 6 therethrough adjacent to one edge of the plate apertures 3 and 4 aligning with apertures 3 and 4 in the flow guide plate 1a, when the plates are stacked, and the other aperture 6 opening on one side into the area 5 of the first flow guide plate 1a and thus forming part of the first flow path through the heat exchanger.

Flow guide plate 1b is the third plate in the stack and takes the form of a frame with an edge portion widened to accommodate apertures 3 and 6 aligning with the apertures 3 and 6 in the preceding heat transfer plate 2a. The open area 7 encompassed by the frame communicates with the aperture 4 in the heat transfer plate 2a, allowing gas to flow across the face of the plate to an aperture 4 in the next heat transfer plate 2b, located adjacent the opposite corner of the square shape from the aperture 4 in the preceding heat transfer plate.

The third flow guide plate 1c is in the form of a frame having an aperture 6 located centrally of one side of the frame within an intrusion into the frame, and an aperture 4 at a corner of the opposite side of the frame, which is widened accordingly to accommodate it. The open area 8 of the frame communicates with the aperture 3 of the preceding heat transfer plate 2b and with an aperture 3 in the opposite corner of the third heat transfer plate 2c, which has an aperture 6 corresponding to that in the third flow guide plate 1c and apertures 3 and 4 in the two corners opposite to it.

The same sequence of flow guide and heat transfer plates 1 and 2 is then repeated in the next six plates, but the plates are flipped so that the flow directions across the faces of the heat transfer plates are reversed with respect to the first six plates. The next six plates revert to the pattern of the first six and this pattern is repeated throughout the stack. It will be seen, therefore, that in this particular configuration only three different designs of flow guide plates and three different designs of heat transfer plates need to be manufactured.

Dependent upon the flow-rates of the gases, the number of cells in a heat exchanger stack could vary substantially.

Figure 2:
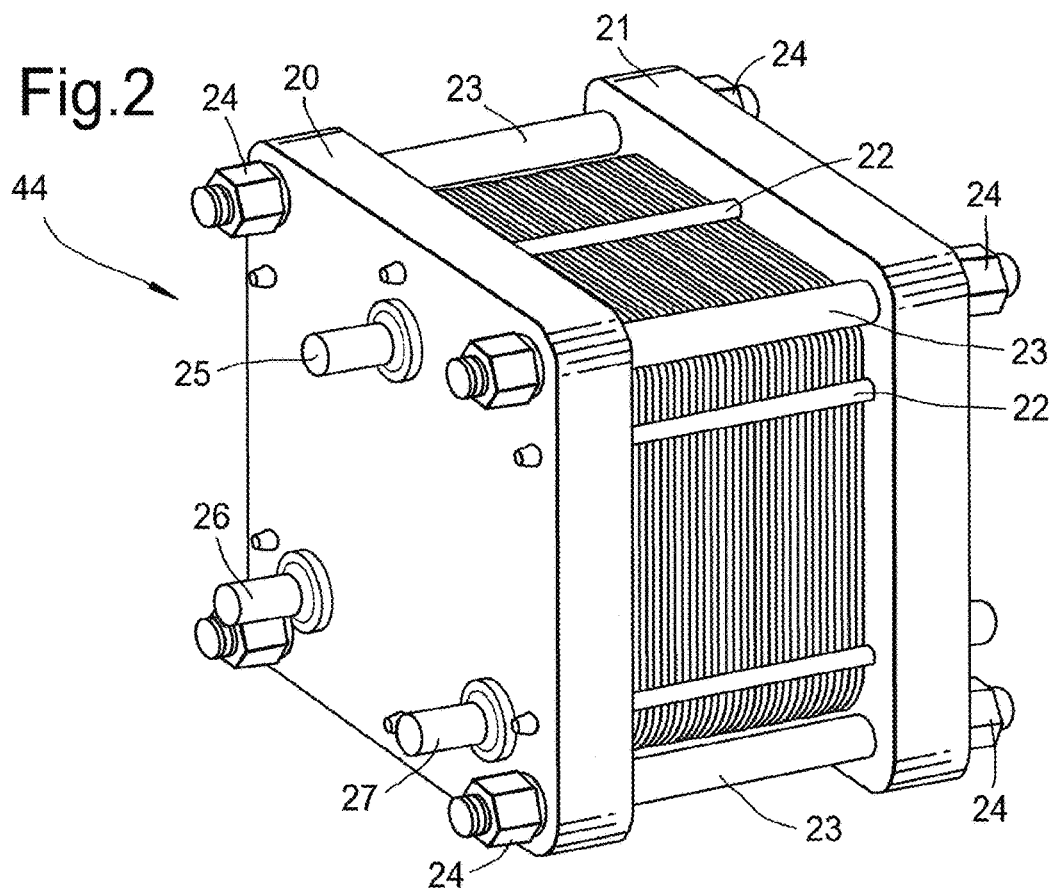
FIG. 2 is a perspective view of the complete heat exchanger incorporating plates of the type illustrated in FIG. 1.

FIG. 2 shows the stack of plates assembled between two end plates 20 and 21 with alignment pins 22 extending between them to hold the plates in alignment and threaded tie rods 23 and nuts 24 to clamp the assembly. Connecting spigots 25, 26 and 27 are provided on each end plate 20 and 21, for connecting the three flow paths within the exchanger to external gas flow pipes.

The heat exchanger of this design makes use of materials which have very similar coefficients of linear thermal expansion in order to avoid stresses which would otherwise build up during thermal cycling and gradients through the length of the heat exchanger. In order to achieve this, the heat exchanger is constructed with 316L stainless steel components throughout, with a high-temperature copper-brazed bond between each component in the construction. Both 316L stainless steel and copper have a coefficient of linear thermal expansion of around $16 \times 10^{-6}$ mm/° C., rendering them ideal for cooperative use in these applications.

In order for the unit to operate at the pressures which may be required of the hydrogen production system, the heat exchanger must be constructed of a suitable wall-thickness. This requirement is made even greater by the need to withstand an explosion at any point within the gas-transportation system in order to resist the associated radially outward forces.

Similarly, the unit must be designed to withstand the linear cell-to-cell separation forces under such conditions. This requires a substantial area of high-integrity braze interface at each joint in the unit, aided by end-plates of substantial thickness and tie-rods. Placed between each flow-guide plate and each heat transfer plate are pre-formed copper foils which form high-strength joints between the stainless steel plates in the high-temperature vacuum brazing operation in which the unit is finally bonded.

Connectors at each end of each gas pathway are required to withstand the above described pressures and pressure spikes without failure. This, in turn, requires a joint between the heat exchanger end-plate and each connector to be of similarly high integrity. Such connectors may be threaded or tubular in construction, dependent upon mating technologies.

Figure 3:
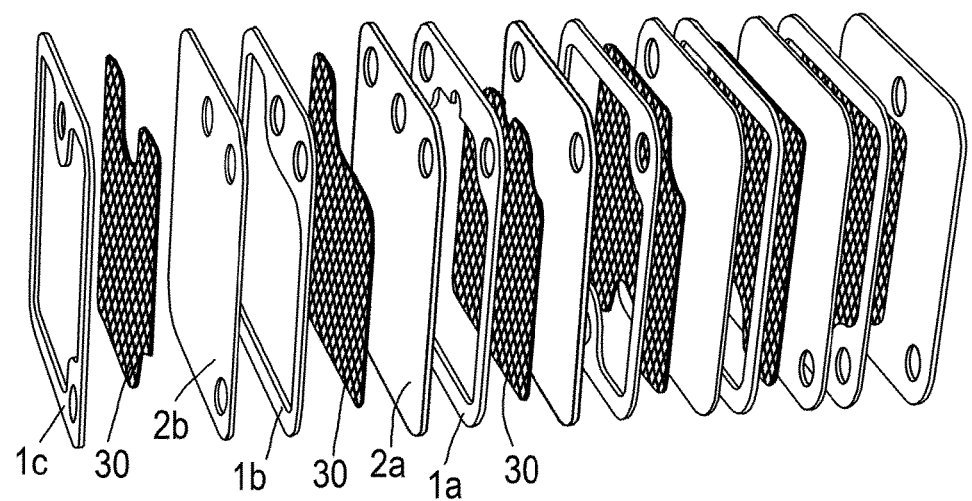
FIG. 3 is an exploded view of a sequence of plates according to another embodiment, prior to assembly into a heat exchanger.

For improved heat transfer, cells may have a matrix of metal past which the gas can freely flow, while giving rise to greater turbulence. This could be in welded or woven mesh form or directly imposed on the profile of the cell plate. As illustrated in FIG. 3, the formed inserts 30 are made from stainless steel mesh which could be of welded or woven construction. Alternatively, the heat transfer plates could have a form imposed by pressing or stamping to obtain the same result.

The function of these inserts is three-fold:

a. They create turbulent flow of the gases passing across their profile, thereby increasing the potential for transfer of thermal energy b. They provide additional surface area to the gases in order to improve heat transfer, and
c. They offer resistance to the deformation of heat transfer plates in the event of a significant differential pressure between cells.

Orientation of flow manifolds in the stack can be varied to accommodate assembly in specific environments, should this be a requirement. An additional benefit of this arrangement is that the number of cells in a given gas stream can be varied to accommodate differential thermal transfer rates from fluid-to-fluid, whether or not the fluid is gaseous or liquid.

Figure 4:
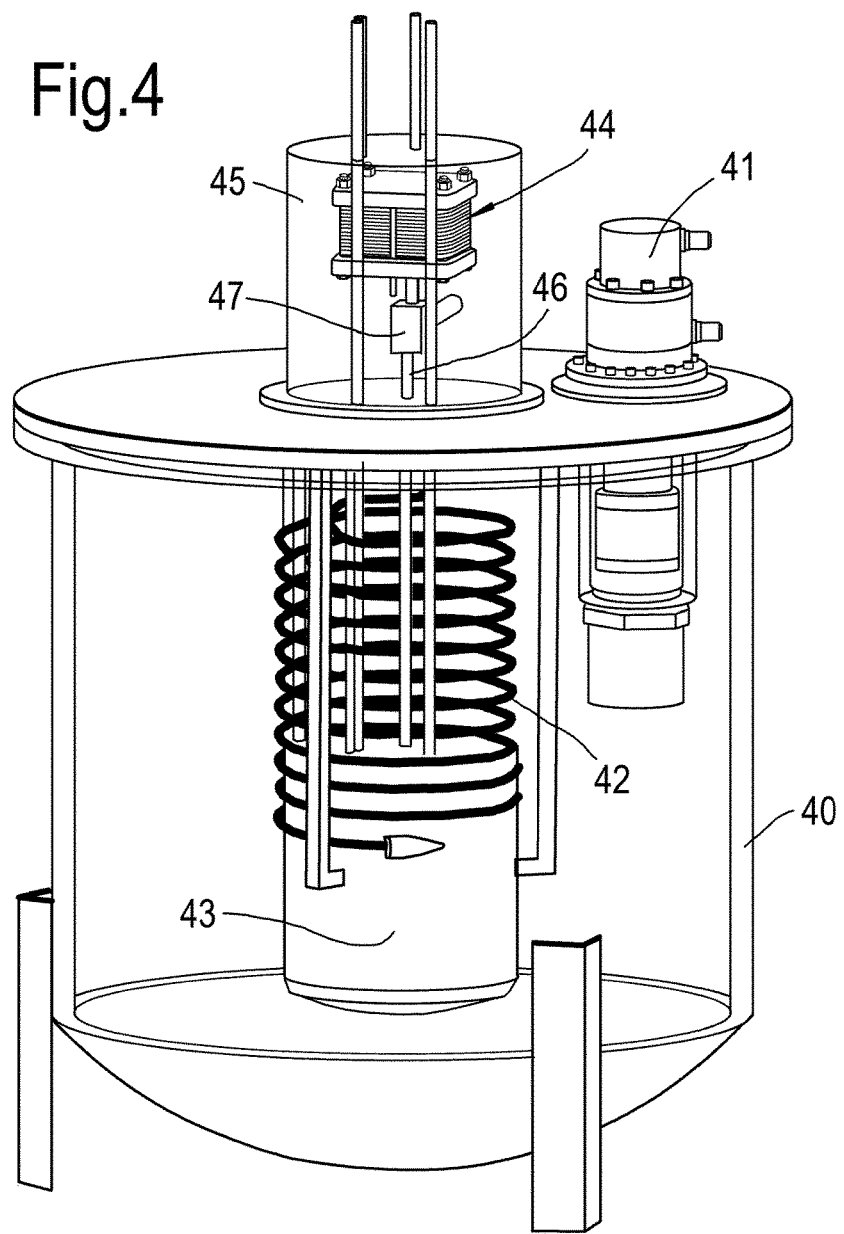
FIG. 4 is a view of a gas separation apparatus embodying the heat exchanger of the invention.

Referring now to FIG. 4, one configuration of a cryogenics system using the heat exchanger of the invention comprises a Dewar flask 40 containing liquid nitrogen. The flask 40 is provided with a cold head 41 to maintain the low temperature in the flask in conventional manner. A condensing coil 42 has at least the major portion thereof submerged in the liquid nitrogen and leads into a reservoir 43 for the liquid oxygen. The hydrogen, which remains gaseous, is led direct to a first of the inputs to the heat exchanger 44, which is mounted in a vacuum chamber 45 located above the Dewar flask 40. The liquid oxygen reservoir 43 communicates through a pipe 46 with a flow control valve 47 within the vacuum chamber 45 and the gaseous oxygen emerging therefrom is conducted to a second of the inputs to the heat exchanger. A mixed gas stream from an electrolyser is input to the third flow path of the exchanger at the opposite end thereof.

By housing a unit of this design in a vacuum chamber, efficient exchange of thermal energy can be achieved, with one end of the unit being at close to ambient temperature, while the other end is at cryogenic temperatures of around 70K to 90K (−203.15° C. to −183.15° C.). One example of a system in which there is a heat exchanger according to the invention is shown in FIG. 4, in which a Dewar of liquid nitrogen is kept cool with a cold-head. Submerged in the liquid nitrogen (LN) is a reservoir for collection of the oxygen. As the oxygen takes cooling power from the LN, the cold-head maintains the temperature.

The heat exchanger as described above sits in a vacuum chamber above the Dewar, taking the hydrogen and oxygen streams In at the base, and the mixed-gas stream in at the top. As the streams pass from cell-to-cell, the thermal energy is transferred, with the incoming stream cooled to around 70K to 90K and the outgoing streams warmed to around ambient temperature, thereby reducing to an absolute minimum the power required to maintain the temperature of the LN in the Dewar. This helps optimise the efficiency of the end-to-end process of hydrogen and oxygen production by electrolytic water decomposition.

Other designs and arrangements for a three-stream heat exchanger may be derived from the unit described above. Critically, this application covers the use in combination with a cryogenics system of a heat exchanger which performs to the aforementioned criteria.

In the graphic below, the mixed gas stream enters the heat exchanger from the top and travels down through it, cooling as it passes from cell-to-cell. A condensing coil which sits in the LN finally cools the gas stream, ensuring distillation of 99%+ of the oxygen which collects in the oxygen reservoir near the bottom of the Dewar.

From the $O_2$ reservoir, the liquid oxygen is forced back out by differential pressure between the incoming and outgoing gas streams to pass through the liquid $O_2$ flow control valve after which it enters the bottom of the heat exchanger.

Similarly, the hydrogen stream leaves the top of the $O_2$ reservoir to pass through the heat exchanger. Other designs of cryogenics system may be used for the liquefaction process which will require a 3-stream heat exchanger in order to optimise efficiency.

Figure 5:
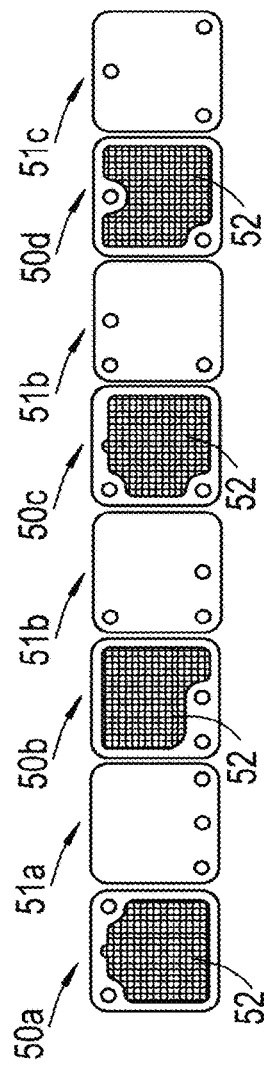
FIGS. 5 and 6 illustrate an alternative sequence of plates to that shown in FIG. 1.
Figure 6:
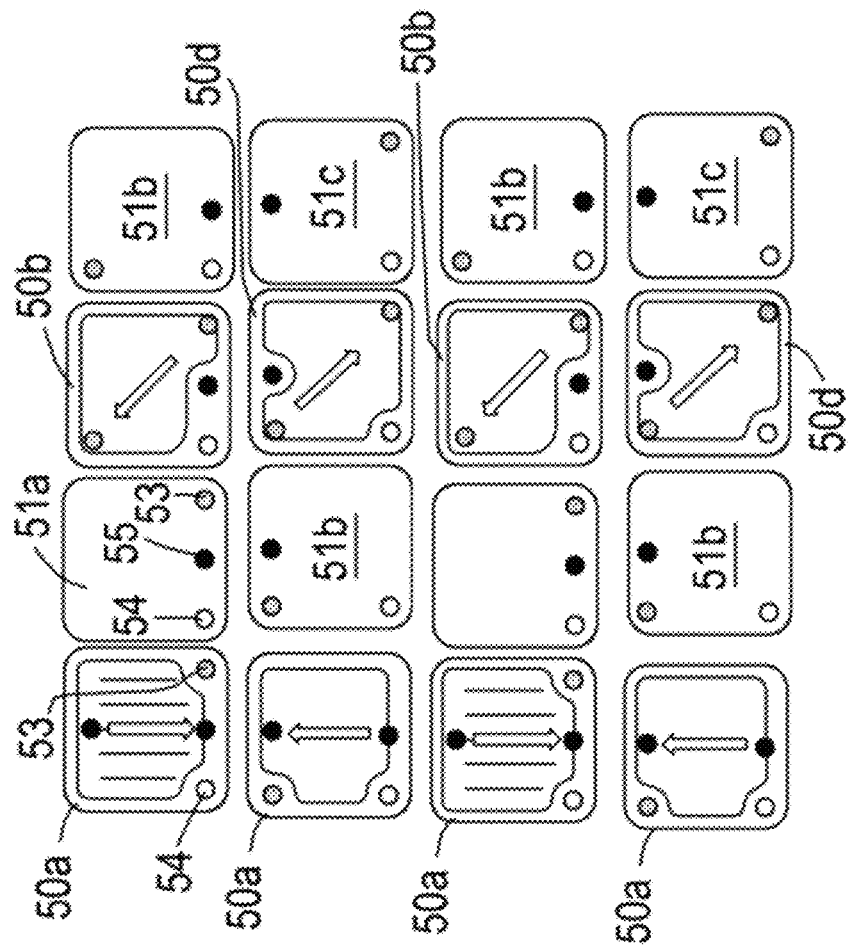

In the arrangement of cells shown in FIGS. 5 and 6, four different internally formed flow guide plates 50a, 50b, 50c, and 50d and three heat transfer plates 51a, 51b and 51c (one of which is used twice in each 4-cell group) are employed. The mixed gas stream is represented by black ports and arrows, the oxygen flow by grey ports and arrows and the hydrogen by white ports. FIG. 6 illustrates the sequence of plates forming a group of cells, with heat transfer plates 51 being placed over the flow guide plates 50 immediately to their left in the Figure, with the first in the next row being placed directly on the last in the preceding row. Each flow guide plate is in the form of a frame with a woven mesh insert 52 within the frame and an apertures 53, 54, 55 through the frame defining separate flow paths. Thus, flow guide plate 50a has an aperture 53 forming part of the oxygen flow path and an aperture 54 forming part of the hydrogen flow path, while the area within the frame guides the flow of the mixed gas stream across the face of the adjacent heat transfer plate 51a. The heat transfer plate 50a has three apertures 53, 54 and 55 therethrough, the central aperture 55 receiving the mixed gas stream, which is passed through aligned apertures 55 in the next two plates 50b and 51b before entering the space defined by the next flow guide plate 50a in the sequence, rotated through 90° relative to the first so that the mixed stream flows across it in the reverse direction. Similarly, the oxygen stream flows across the cell defined by the flow guide plate 50b and then flows across the flow guide plate 50d in the opposite direction. It will be seen from FIG. 6 that, in the sequence of eight cells so defined, the oxygen flow exchanges heat with the mixed gas flow, while the hydrogen simply flows through the apertures 54 without transferring its thermal energy. Groups of cells can thus be configured so that in the overall heat exchanger there are fewer cells through which the hydrogen passes than for those through which oxygen passes, so that heat exchange from the oxygen flow, which has a lower thermal conductivity than hydrogen, balances that of the hydrogen.

The invention claimed is:

1. A cryogenic system for the separation of electrolytically produced oxygen and hydrogen comprising a heat exchanger,
the heat exchanger being configured for use in the cryogenic system for the separation of electrolytically produced oxygen and hydrogen, the heat exchanger being configured to exchange heat between a mixed gas stream, hydrogen, and oxygen,
the heat exchanger comprising a plurality of cells formed by a stack of alternate planar flow-guide plates and heat transfer plates,
each heat transfer plate having at least three apertures therethrough, each aperture defining a part of a respective one of at least three fluid flow paths in the heat exchanger,
each flow-guide plate having apertures therethrough corresponding to at least two of the flow paths and a larger aperture therethrough configured to guide fluid in a remaining flow path across a face of the heat transfer plates between which the flow-guide plate is located,
each successive flow-guide plate in the stack forming part of a different flow path from a preceding one in the stack.

2. The cryogenic system according to claim 1, wherein the cells in the stack are not equally divided between the three flow paths.

3. The cryogenic system according to claim 1, wherein a direction of flow across the face of the heat transfer plates in each of the flow paths changes along the length of the stack.

4. The cryogenic system according to claim 1, wherein the heat exchanger further comprises a pair of end plates between which the stack of alternate planar flow guide plates and heat transfer plates are clamped by means of tie rods.

5. The cryogenic system according to claim 4, wherein the tie rods are threaded tie rods, and the stack of alternate planar flow-guide plates and heat transfer plates are clamped by means of the threaded tie rods and nuts.

6. The cryogenic system according to claim 4, wherein the heat exchanger further comprises alignment pins extending between the end plates to hold the plates in alignment.

7. The cryogenic system according to claim 4, wherein the end plates have flow connections therethrough.

8. The cryogenic system according to claim 7, wherein the heat exchanger comprises connecting spigots, provided on each end plate for connecting the three flow paths within the heat exchanger to external gas flow pipes.

9. The cryogenic system according to claim 1, wherein the three flow paths comprise one mixed gas stream flow path, one hydrogen flow path, and one oxygen flow path, the mixed gas flow path and the oxygen flow path being longer than the hydrogen flow path.

10. The cryogenic system according to claim 1, comprising a liquid oxygen reservoir connected to the oxygen flow path.

11. The cryogenic system according to claim 1, comprising an electrolyser connected to the mixed gas flow path.

* * * * *